(12) United States Patent
Thyssen et al.

(10) Patent No.: US 7,641,537 B2
(45) Date of Patent: Jan. 5, 2010

(54) ROTATING TOOL HAVING AN ELECTRIC DATA CARRIER

(75) Inventors: Wolfgang Thyssen, Bad Sackingen (DE); Markus Gretler, Hedingen (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 11/708,538

(22) Filed: Feb. 21, 2007

(65) Prior Publication Data

US 2007/0199983 A1    Aug. 30, 2007

(30) Foreign Application Priority Data

Feb. 21, 2006    (DE) ................... 10 2006 008 395

(51) Int. Cl.
*B24B 51/00*    (2006.01)
(52) U.S. Cl. .................. 451/5; 451/47; 451/900
(58) Field of Classification Search ........... 483/5, 483/6, 7–12; 451/5, 6, 8, 47, 900; 700/164; 409/2, 80; 408/16, 9, 11, 8; 407/120
See application file for complete search history.

(56) References Cited

U.S. PATENT DOCUMENTS

| | | | |
|---|---|---|---|
| 4,588,339 A * | 5/1986 | Bilz ........................... | 483/9 |
| 4,720,907 A * | 1/1988 | Rapp .......................... | 483/9 |
| RE32,837 E * | 1/1989 | Corni ......................... | 483/9 |
| 4,809,426 A * | 3/1989 | Takeuchi et al. ........... | 483/8 |
| 4,856,177 A * | 8/1989 | Takeuchi et al. ........... | 483/9 |
| 4,890,306 A * | 12/1989 | Noda ........................ | 483/9 |
| 5,692,998 A * | 12/1997 | Weigel ...................... | 483/12 |
| 6,409,439 B1 * | 6/2002 | Riviere ...................... | 409/232 |
| 6,474,914 B1 * | 11/2002 | Lang ......................... | 409/144 |
| 6,585,628 B1 | 7/2003 | Tsung et al. | |
| 6,736,700 B2 * | 5/2004 | Bollinger et al. ........... | 451/5 |
| 7,011,613 B2 * | 3/2006 | Moller et al. ............... | 483/11 |
| 7,096,077 B2 * | 8/2006 | Price et al. .................. | 483/8 |
| 7,289,873 B2 * | 10/2007 | Redecker et al. ........... | 700/174 |
| 2006/0014475 A1 * | 1/2006 | Sekiya ........................ | 451/5 |
| 2006/0159533 A1 * | 7/2006 | Zeiler et al. ................ | 408/226 |

FOREIGN PATENT DOCUMENTS

| | | |
|---|---|---|
| DE | 100 13 612 A1 | 9/2001 |
| DE | 101 35 531 A1 | 3/2003 |
| DE | 101 63 734 A1 | 7/2003 |
| DE | 10 2004 051 145 A1 | 4/2006 |
| EP | 0 132 528 B1 | 2/1985 |
| EP | 1323495 | 12/2002 |
| EP | 1 746 530 A1 | 1/2007 |
| JP | 4-304943 A * | 10/1992 |

OTHER PUBLICATIONS

Computer Generated Translation of EP1323495.*
Machine translation of EP 1746530, which patent document was published in Jan. 2007.*

* cited by examiner

*Primary Examiner*—Erica E Cadugan
(74) *Attorney, Agent, or Firm*—Browdy & Neimark, PLLC

(57) ABSTRACT

A rotating cutting tool (2, 14, 16) for machining a workpiece on a machine tool, in particular for dressing the grinding worm of a tooth flank grinding machine, having an electronic data carrier for storing data relevant to the use of the tool, has an annular data carrier (7) arranged concentrically to the rotation axis of the tool and having an above-average storage capacity, and said data carrier (7), during the machining process, with the tool (2, 14, 16) rotating, exchanges tool-relevant data, at a high transmission rate, with a likewise annular write/read head (10) arranged concentrically thereto on the machine.

22 Claims, 3 Drawing Sheets

ROTATING TOOL HAVING AN ELECTRIC DATA CARRIER

TECHNICAL FIELD

The present invention essentially relates to the automation and optimization of machining processes, in particular processes for grinding toothed workpieces, in which rotating tools having a complicated tool profile are used, the current profile coordinates of which and if need be further technical and technological data which characterize, for example, the cutting behavior or the tool-life behavior between regrinds are required for setting up the machine and for the optimum specific tool use in the process. This requires the exchange of substantially larger amounts of data between tool and machine than is generally the case, and this exchange must also be ensured when the tool is rotating under normal machining conditions, e.g. at high tool speeds and when feeding production additives such as grinding lubricant.

PRIOR ART

It is known, not only in machine tool construction but also in many other sectors, to provide tools or other objects with a data carrier on which data characteristic of them are stored, and to interrogate these data by means of a read head before the next process step is effected. A further field of application of this technology in machine construction is the identification and the transfer of tool-setting and tool-life data in tools, e.g. of a machining center. To this end, the tool is provided at a suitable point with a data chip whose data are read before the use of a tool by a read head fastened to the machine and are fed to the machine control. In individual cases, the data carrier is also described with, for example, new tool-life values before the removal from the machine. However, the data transfer is not effected during the machining process but rather in a standstill of the tool in a protected position. On account of the restricted space conditions on the tool or tool holder, the storage capacity is restricted, but is sufficient for normal requirements.

On the other hand, DE 101 35 531.9 describes the use of a write/read system that is active during the machining process. Not only are the stored tool-specific data read during the use of the tool, but the data carrier of the tool is also described with the new current tool-relevant data of the machine control. Since there is not sufficient space on the tool for the arrangement of a data carrier sufficient for the unusually large volume of data in this case, the data carriers are accommodated in a housing which is separated from the tool and whose data transmission area is releasably connected to the data transmission area on the machine during the use of the tool. The disadvantage of this solution is that the data carrier is not firmly connected to the tool and for that reason has to be carried along loosely for all uses of the tool.

EP-B1-0 132 528 discloses a tool or a tool holder for machining on numerically controlled machining centers, said tool or tool holder being captively connected to a data carrier in the form of an EEPROM memory for various tool-specific characteristic data. The memory is accommodated in a bore in a firmly preset relative rotary position, and it therefore cannot be accessed during operation.

The same also applies to the cutting head from U.S. Pat. No. B1-6,585,628, the non-volatile memory of which is fastened in a recess of the cutting head and which can be accessed by means of a hand-guided probe.

SUMMARY OF THE INVENTION

It is therefore an object of the invention to propose a machine tool having a rotating cutting tool and also a cutting tool for such a machine which avoid the disadvantages of known machine tools and cutting tools and in which the data relevant to the use of the tool are not only captively connected to the tool but are also always kept up to date.

This object is achieved by features of the present invention.

The essence of the invention consists in connecting the cutting tool to an electronic data carrier for storing data relevant to the use of the tool, and in providing means for the non-contact roll-in and/or roll-out of data of the electronic data carrier on the machine tool, said means permitting a roll-in and/or roll-out of data of the electronic data carrier during the machining process when the cutting tool is rotating.

A configuration of the invention comprises the fact that the cutting tool is firmly connected to a tool-holding fixture, and that the electronic data carrier is attached to the tool-holding fixture.

An alternative configuration comprises the fact that the electronic data carrier is directly attached to the cutting tool.

The electronic data carrier is preferably of annular design and is arranged concentrically to the rotation axis of the cutting tool, the electronic data carrier having an annular data transmission area, via which the data are exchanged between the electronic data carrier and the roll-in and roll-out means in a non-contact manner.

In particular, the data transmission area is arranged on an end face of the electronic data carrier or on an outer circumferential side of the electronic data carrier.

Another configuration of the machine tool according to the invention comprises the fact that the means for the non-contact roll-in and roll-out of data of the electronic data carrier are rigidly connected to the machine tool and are designed and arranged in such a way that they are located with a data transmission area opposite the data transmission area of the electronic data carrier with a slight gap in between.

The means for the non-contact roll-in and roll-out of data of the electronic data carrier preferably comprise a write/read head, the write/read head likewise being of annular design, and the write/read head being arranged coaxially to the electronic data carrier and being separated from the latter by a radial or axial transmission gap between the data transmission areas.

In particular, the means for the non-contact roll-in and roll-out of data of the electronic data carrier work in an inductive manner.

The transmission gap preferably has a width of less than 1 mm.

A further configuration of the machine tool according to the invention comprises the fact that the electronic data carrier is supplied with electrical energy in a non-contact manner by the means for the roll-in and roll-out of data of the electronic data carrier.

In order to accommodate the tool, a tool spindle surrounded by a tool spindle housing is provided, and the electronic data carrier is arranged on an end face, facing the tool spindle housing, of the tool.

According to another configuration of the invention, the data transmitted between the electronic data carrier and the means for the roll-in and roll-out of data of the electronic data carrier comprise at least one of the following tool-specific items of information:
  tool-geometry data
  tool-coating characteristic data
  tool-life data
  tool-use technological data
  technological data of previous uses of the tool.

A preferred configuration of the cutting tool according to the invention comprises the fact that it is firmly connected to a tool-holding fixture, and that the electronic data carrier is attached to the tool-holding fixture.

If the cutting tool is firmly connected to a tool-holding fixture and the electronic data carrier is attached to the tool-holding fixture, it is advantageous if the actuating means, in particular in the form of a switch, are arranged on the tool-holding fixture of the cutting tool in such a way that the data of the electronic data carrier are erased automatically when the cutting tool is released from the tool-holding fixture.

However, the electronic data carrier may also be directly attached to the cutting tool.

In particular, the electronic data carrier is of annular design and is arranged concentrically to the rotation axis of the cutting tool, the electronic data carrier having an annular data transmission area, via which the data are exchanged between the electronic data carrier and the roll-in and roll-out means in a non-contact manner, in particular in an inductive manner.

The cutting tool is preferably a tool for producing gears, in particular a diamond dressing roll, a diamond dressing gear or a grinding worm.

BRIEF DESCRIPTION OF THE DRAWINGS

The invention is explained in more detail below with reference to three preferred embodiment variants which are shown in the attached drawings, in which.

WAYS OF IMPLEMENTING THE INVENTION

Figure 1:
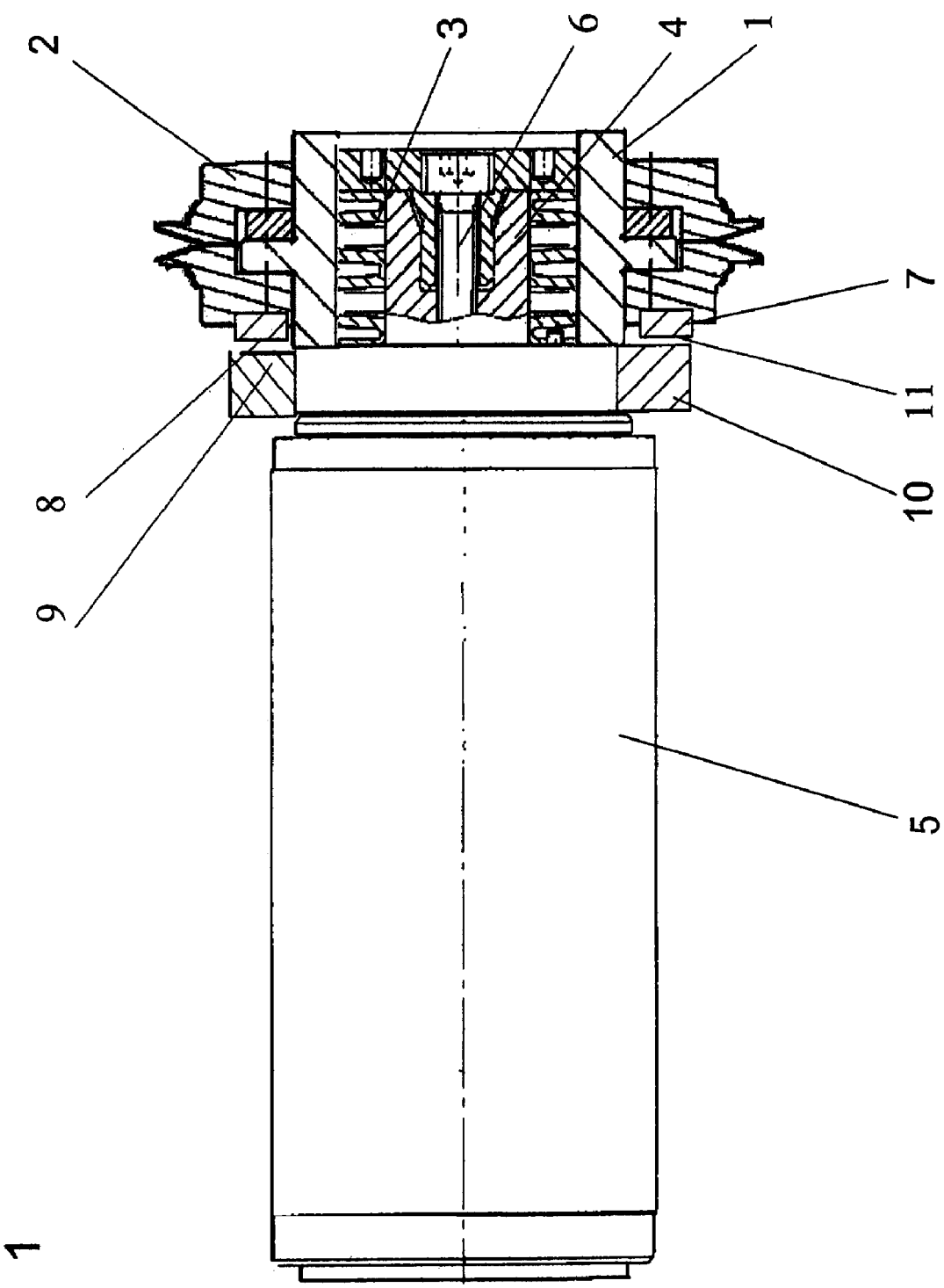
FIG. 1 shows a schematic illustration of a disc-shaped dressing tool clamped on a tool spindle.

In a first embodiment variant of the invention shown in FIG. 1, the tool consists of a two-piece diamond dressing roll 2 which is arranged on a chuck 1 for dressing grinding wheels for gear grinding and which is releasably connected to a tool spindle 4 by means of a clamping element 3. The tool spindle 4 is rotatably mounted on a tool spindle housing 5 arranged on a gear grinding machine.

The geometry of profile rolls for the dressing of grinding wheels and in the special case of cylindrical grinding worms is described by data such as the diameter of the diamond dressing roll 2, the axial arrangement of the dressing roll profile relative to the grinding machine, and the actual dressing roll profile.

The technical parameters of dressing rolls that determine the cutting behavior or the tool-life behavior between regrinds are generally described by characteristics of the volume of grinding space of the dressing rolls, material characteristics, the specific rate of metal removal during the dressing process, and the cutting path covered overall during all the previous dressing operations. These data, which are updated with each new dressing operation, permit specific optimized guidance of the dressing process, provided they can be fed to the machine control and can be processed by means of intelligent software.

To this end, an annular data carrier 7 is arranged on the tool 2 concentrically to its rotation axis 6, said data carrier 7 being integrated in the tool outer contour and having an end-face transmission area 8. Axially offset from the latter by a gap of less than 2 mm is the likewise end-face transmission area 9 of a likewise annular write/read head 10 which is arranged concentrically to the rotation axis 6 of the tool 2, is connected to the machine control and is firmly connected to the tool spindle axis 5. The data exchange between data carrier 7 and machine is effected during the dressing process, with tool 2 rotating under operating conditions, in a non-contact inductive or capacitive manner via the data transmission gap 11 between the data carrier 7 and the write/read head 10. In this case, the updated data is transmitted in parallel or sequentially—for example after completion of a dressing operation or of a dressing stroke—by the machine control via write/read head 10 to the data carrier 7 of the tool 2 and stored there. This ensures that the data located in the tool-side data carrier 7 is always up to date.

Figure 2:
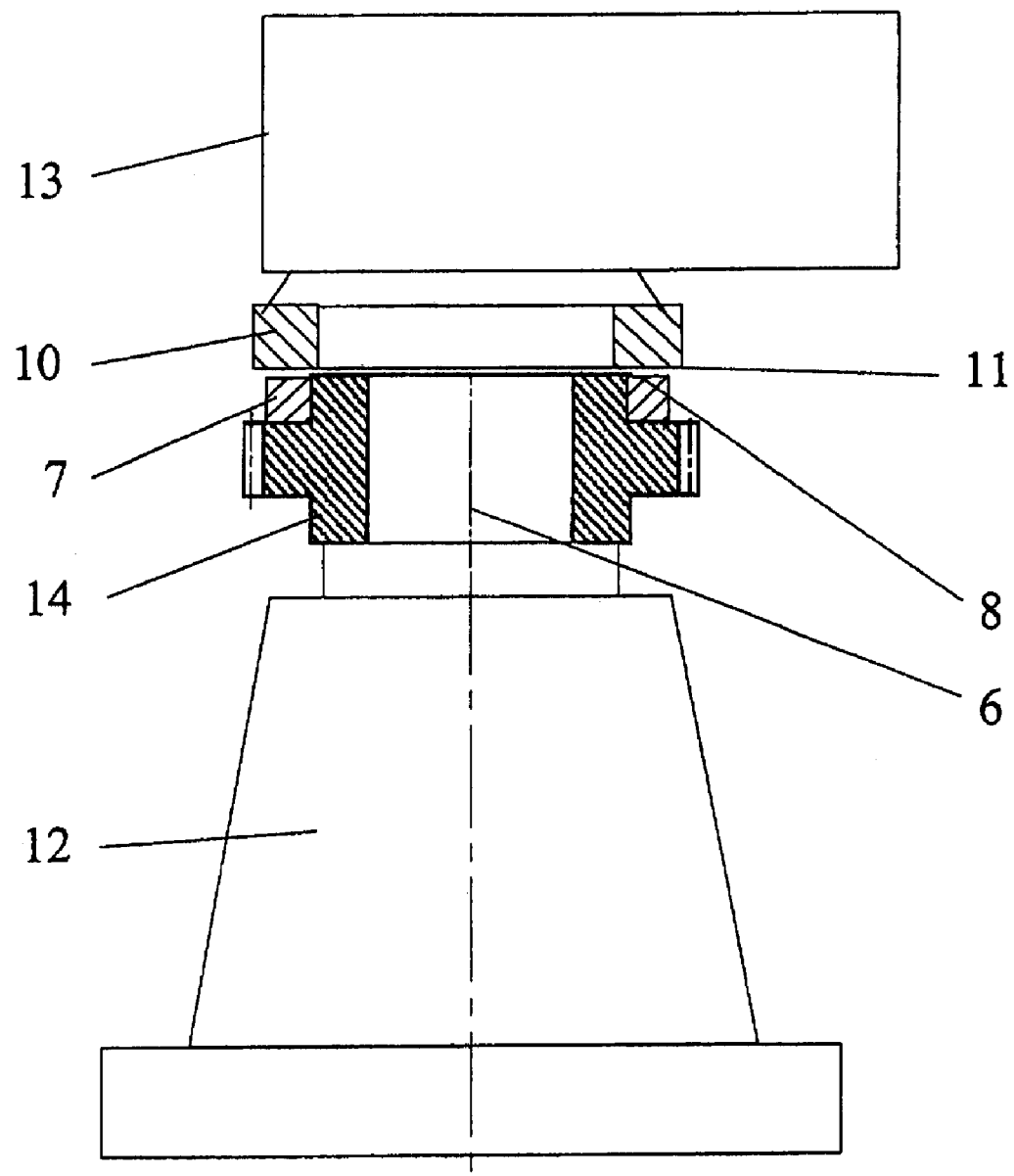
FIG. 2 shows a schematic illustration of a gear-shaped dressing tool clamped on a tool spindle.

In a second embodiment variant of the invention shown in FIG. 2, the tool consists of a diamond dressing gear 14 clamped in place on a spindle 12 for the dressing of a grinding worm for the grinding of gears. The spindle 12 is rotatably mounted in the machine.

Here, too, as in the first embodiment variant, an annular data carrier 7 for the tool-specific data of the diamond dressing gear 14 is arranged on the tool concentrically to its rotation axis 6, said data carrier 7 being integrated in the tool outer contour and having an end-face transmission area 8. The likewise annular write/read head 10 arranged above it is firmly connected to the machine via a holder 13, in such a way as to be separated from the data carrier 7 by the transmission gap 11.

Figure 3:
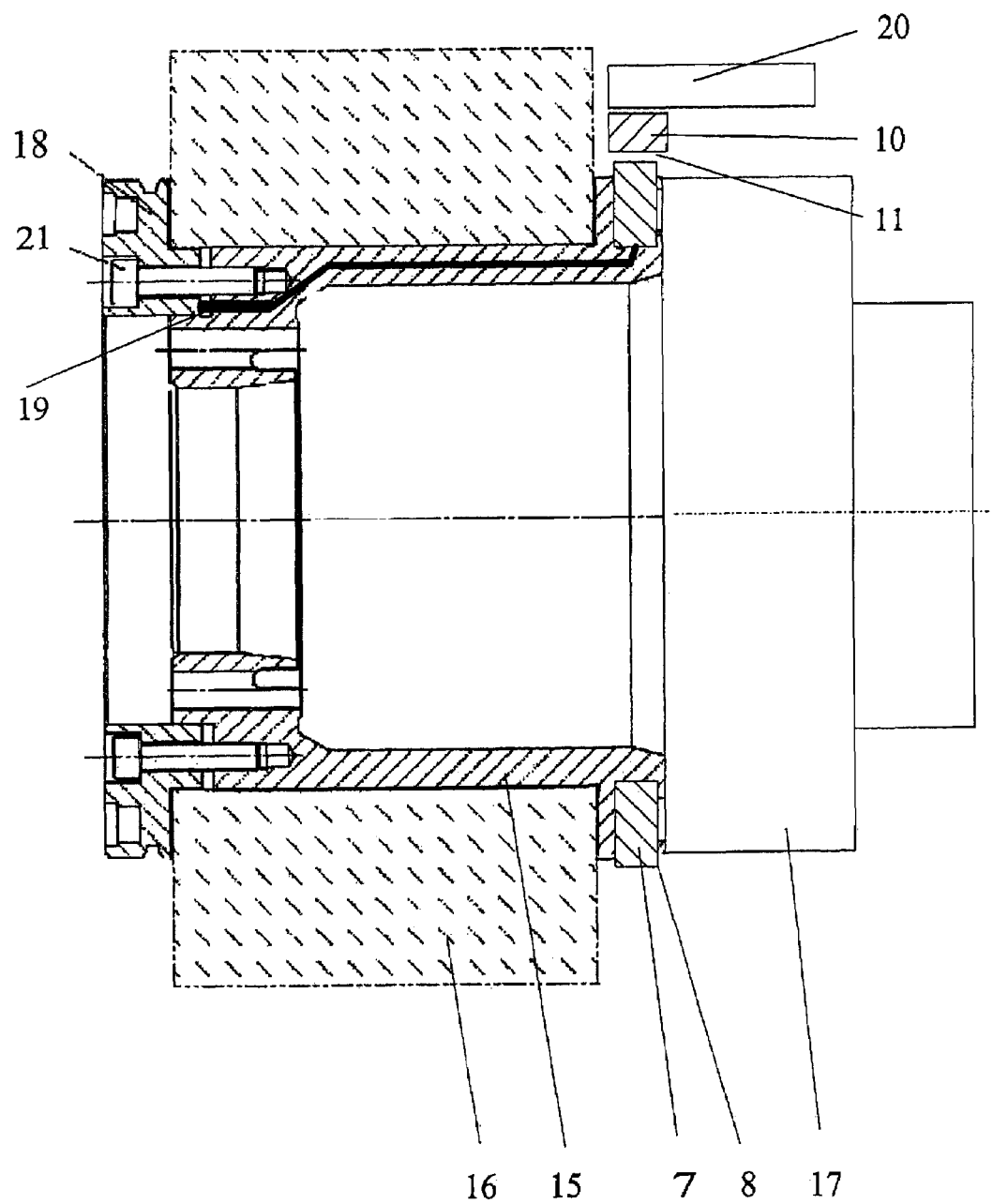
FIG. 3 shows a schematic illustration of a grinding worm clamped on a grinding spindle for gear grinding.

In the third embodiment variant shown in FIG. 3, the tool is a grinding worm 16 clamped in place on a grinding worm flange 15 for gear grinding. The grinding worm flange 15 is releasably connected to the grinding spindle head 17. According to the invention, in the case of the grinding worm, the data transmission carrier 7, which in this case is also annular and has a circumferential data transmission area 8 here, is arranged for practical reasons on the grinding wheel flange and not in the rapidly wearing grinding worm, so that the costs of the grinding worm are unaffected by the data exchange between tool and machine. The write/read head 10 surrounds the data carrier 7 at the transmission gap distance over its entire circumference or over part thereof.

To describe the geometry of grinding wheels, especially grinding worms for continuous generation gear grinding, the data inter alia with regard to the actual diameter of the grinding worm, the possibly corrected actual module, the number of starts and the actual profile geometry and also the total dressed length of the worm thread which have been realized up to the last dressing operation are required. These data are continuously updated during use and are always available on the data carrier 7 of the grinding worm over its entire tool life.

The features cited above fully describe inter alia the actual geometry of the grinding worm, provided the grinding worm clamped in place during the last dressing operation is still clamped in place on the mounting flange and has not been changed in the meantime. When the grinding worm is changed, these data are invalid and must not be used by mistake for the next dressing operation in order to avoid a collision between grinding tool and dressing tool. For that reason, care must be taken to ensure that the stored grinding worm data are erased when the grinding worm is changed. According to the invention, for the erasing of the data stored in relation to the tool when the grinding wheel is changed on the grinding wheel flange 15, provision is made for at least one clamping screw 21 of the clamping ring 18 or the cap 18 itself to actuate a switch 19, the opening of which initiates the erasing of the data on the data carrier 7 when the screw 21 or the cap 18 is released. There are therefore no actual data available during the first dressing of a grinding worm that has just been clamped in place, and the dressing process must be run according to the scheduled data which is present in the machine control, but which may also contain any corrections to previous dressing operations, these corrections being filed in the machine data.

List of Designations

1 Chuck
2 Diamond dressing roll
3 Clamping element
4 Tool spindle
5 Tool spindle housing
6 Tool rotation axis
7 Data carrier
8 Transmission area of the data carrier
9 Transmission area of the write/read head
10 Write/read head
11 Data transmission gap
12 Spindle
13 Holder
14 Diamond dressing gear
15 Grinding worm flange
16 Grinding worm
17 Grinding spindle head
18 Clamping ring
19 Switch
20 Holder
21 Clamping screw

The invention claimed is:

1. A machine tool comprising:
a rotating cutting tool (2, 14, 16) for machining a workpiece held on the machine tool, wherein the cutting tool (2, 14, 16) is a tool for producing gears.
an electronic data carrier (7) connected to the cutting tool (2, 14, 16) for storing data relevant to the use of the cutting tool, and
means (10) for performing the non-contact roll-in and/or roll-out of data of the electronic data carrier (7) provided on the machine tool,
said means permitting a transmission of data from the electronic data carrier (7) to the machine tool and receipt of data by the electronic data carrier (7) from the machine tool during the machining process when the cutting tool (2, 14, 16) is rotating,
the electronic data carrier (7) and the means (10) being arranged concentrically to the rotation axis (6) of the cutting tool (2, 14, 16), and
wherein the data transmitted between the electronic data carrier (7) and the means (10) for the roll-in and roll-out of data of the electronic data carrier (7) comprise at least one of the following tool-specific items of information:
tool-geometry data,
tool-coating characteristic data,
tool-life data,
tool-use technological data, and
technological data of previous uses of the tool.

2. The machine tool as claimed in claim 1, further comprising a tool-holding fixture (15) to which the cutting tool (16) is firmly connected, wherein the electronic data carrier (7) is attached to the tool-holding fixture (15).

3. The machine tool as claimed in claim 2, further comprising an actuating means comprising a switch (19), arranged on the tool-holding fixture (15) of the cutting tool (16) in such a way that the data of the electronic data carrier (7) is erased automatically when the cutting tool (16) is released from the tool-holding fixture (15).

4. machine tool as claimed in claim 1, wherein the electronic data carrier (7) is directly attached to the cutting tool (2, 14).

5. The machine tool as claimed in claim 4, further comprising a tool spindle (4) to accommodate the tool (2), a tool spindle housing (5) surrounding the tool spindle (4), and wherein the electronic data carrier (7) is arranged on an end face, facing the tool spindle housing (5), of the tool (2).

6. The machine tool as claimed in claim 1, wherein the electronic data carrier (7) has an annular shape that is arranged concentrically to the rotation axis (6) of the cutting tool (2, 14, 16), and wherein the electronic data carrier (7) has an annular data transmission area (8), via which the data are exchanged between the electronic data carrier (7) and the roll-in and roll-out means (10) in a non-contact manner.

7. machine tool as claimed in claim 6, wherein the data transmission area (8) is arranged on an end face of the electronic data carrier (7).

8. The machine tool as claimed in claim 6, wherein the data transmission area (8) is arranged on an outer circumferential side of the electronic data carrier (7).

9. The machine tool as claimed in claim 6, wherein the means (10) for the non-contact roll-in and roll-out of data of the electronic data carrier (7) comprises a data transmission area (9), said means (10) for the non- contact roll-in and roll-out of data are rigidly connected to the machine tool and are designed and arranged in such a way that said data transmission area (9) of said means (10) is located opposite to the data transmission area (8) of the electronic data carrier (7) with a slight gap in between.

10. The machine tool as claimed in claim 9, wherein the means for the non-contact roll-in and roll-out of data of the electronic data carrier (7) comprise a write/read head (10), wherein the write/read head (10) is of annular design, and wherein the write/read head (10) is arranged coaxially to the electronic data carrier (7) and is separated from the electronic data carrier (7) by an axial transmission gap (11) between the data transmission areas (8, 9).

11. The machine tool as claimed in claim 10, wherein the means for the non-contact roll-in and roll-out of data of the electronic data carrier (7) work in an inductive manner.

12. The machine tool as claimed in claim 10, wherein the transmission gap (11) has a width of less than 1 mm.

13. The machine tool as claimed in claim 1 , wherein the electronic data carrier (7) is supplied with electrical energy in a non-contact manner by the means (10) for the roll-in and roll-out of data of the electronic data carrier (7).

14. A cutting tool with the machine tool as claimed in claim 1, the cutting tool connected to the electronic data carrier (7) for storing the data relevant to the use of the cutting tool, wherein the electronic data carrier (7) is designed for the non-contact roll-in and/or roll-out of data during the machining process when the cutting tool is rotating.

15. The cutting tool with the machine tool as claimed in claim 14, wherein the cutting tool is firmly connected to a tool-holding fixture (15), and wherein the electronic data carrier (7) is attached to the tool-holding fixture (15), wherein the tool holding fixture is configured such that the data are automatically erased from the electronic data carrier when the cutting tool is released from the tool holding fixture, wherein the release of the cutting tool from the tool holding fixture causes a switch to perform the automatic erasure, and wherein the cutting tool is a grinding worm.

16. The cutting tool with the machine tool as claimed in claim 14, wherein the data carrier (7) is directly attached to the cutting tool (2, 14) and wherein the cutting tool is a dressing tool.

17. The cutting tool with the machine tool as claimed in claim 14, wherein the electronic data carrier (7) that is arranged concentrically to the rotation axis of the cutting tool is of annular design, and wherein the electronic data carrier (7) has an annular data transmission area (8), via which the data are exchanged between the electronic data carrier (7) and the roll-in and roll-out means (10) in a non-contact inductive manner.

18. The cutting tool with the machine tool as claimed in claim 17, wherein the data transmission area (8) is arranged on a face of the electronic data carrier (7).

19. The cutting tool with the machine tool as claimed in claim 17, wherein the data transmission area (8) is arranged on an outer circumferential side of the electronic data carrier (7).

20. The machine tool as claimed in claim 1, wherein the cutting tool is a diamond dressing roll (2).

21. The machine tool as claimed in claim 1, wherein the cutting tool is a diamond dressing gear (14).

22. The machine tool as claimed in claim 1, wherein the cutting tool is a grinding worm.

\* \* \* \* \*